United States Patent [19]

Asano et al.

[11] Patent Number: 5,610,464
[45] Date of Patent: Mar. 11, 1997

[54] DIRECT CURRENT MOTOR HAVING A DECREASING COGGING TORQUE

[75] Inventors: Yoshinari Asano, Fukui; Masami Wada, Hirakata, both of Japan

[73] Assignee: Matsushita Electric Industrial Co., Ltd., Osaka, Japan

[21] Appl. No.: 361,547

[22] Filed: Dec. 22, 1994

[30] Foreign Application Priority Data

Dec. 27, 1993 [JP] Japan .................... 5-332920

[51] Int. Cl.[6] .......................... H02K 21/12; H02K 1/12
[52] U.S. Cl. ............................ 310/156; 310/258
[58] Field of Search ........................ 310/156, 265, 310/258, 259, 191, 209, 193

[56] References Cited

U.S. PATENT DOCUMENTS

| | | | |
|---|---|---|---|
| 3,597,646 | 8/1971 | Lawrenson | 310/166 |
| 4,303,843 | 12/1981 | Arnoux et al. | 310/67 R |
| 4,315,171 | 2/1982 | Schaeffer | 310/49 R |
| 4,424,463 | 1/1984 | Musil | 310/49 R |
| 4,516,048 | 5/1985 | Brigham | 310/254 |
| 4,626,781 | 12/1986 | Forkel | 324/174 |
| 5,444,316 | 8/1995 | Ohya et al. | 310/49 R |

FOREIGN PATENT DOCUMENTS 63-31454  2/1988  Japan .

Primary Examiner—Steven L. Stephan
Assistant Examiner—Jonathan Link
Attorney, Agent, or Firm—McDermott, Will & Emery

[57] ABSTRACT

In the direct current motor having Ns pieces of stator teeth and Nr pieces of magnetic poles, each of the plural magnetic poles is disposed shifted with the predetermined shift angles $\Delta\theta i$ around a rotor from the angular reference position defined by even angles around the axis of the rotor, respectively, and the shift angles $\Delta\theta i$ are defined by the below-mentioned expression concerning the least common multiple Nc between the Ns and the Nr;

$$-180/Nc \leq \text{shift angle}\Delta\theta i \leq +180/Nc,$$

wherein, signs "−" and "+" in the expression show a shift direction from the angular reference position in the circumferential direction.

10 Claims, 14 Drawing Sheets

5,610,464

1

DIRECT CURRENT MOTOR HAVING A DECREASING COGGING TORQUE

FIELD OF THE INVENTION AND RELATED ART STATEMENT

1. Field of the Invention

This invention relates to a direct current motor in which a stator with plural stator teeth and a rotor having plural magnetic poles are provided. More particularly the present invention relates to an improvement in the disposition of plural magnetic poles.

2. Description of the Prior Art

In recent years, a direct current motor, which is used in a household electric apparatus, has been required not only to obtain a high output but also to reduce noises and vibrations. The noises and the vibrations are raised by variation of a rotation torque including a cogging torque. The cogging torques is caused by a difference of positional relation between plural stator teeth of a stator and plural magnetic poles of a rotor, and is equal to a sum of forces acting the respective plural magnetic poles in the rotation direction.

A concrete construction of an outer-rotor type direct current motor 100 of the prior art will be elucidated with reference to FIG. 12. FIG. 12 is a sectional view of an outer-rotor type direct current motor 100 of the prior art.

In FIG. 12, a bracket 2 is made of a metal, such as a steel plate, and contains a rotor 3 and a stator 7.

The rotor 3 comprises a rotor shaft 4, which is held via bearings 13, 13' by a housing 12, a pipe shaped rotor yoke 5, which is fixed to one end of the rotor shaft 4, and plural magnetic poles 6 which is fixed to the rotor yoke 5. The rotor shaft 4 is made of a ferro-magnetic metal, such as an electromagnetic iron, and rotatably held to the bracket 2 so that the other end part of the rotor shaft 4 is protruded from the bracket 2. The rotor yoke 5 is made of a ferro-magnetic metal, such as the electromagnetic steel plate, and one end part of the rotor yoke 5 is fixed to one end part of the rotor shaft 4 by welding or shrinkage fit. The plural magnetic poles 6 are poles of a permanent magnet having N poles and S poles. The permanent magnet is fixed on the other end part of the rotor yoke 5 by an adhesive at the location to face the stator 7 with a narrow gap therebetween.

The stator 7 comprises a stator core 8 and stator windings 9. The stator core 8 is made of a ferro-magnetic metal, such as the electromagnetic steel plate, and consists of a stator yoke 10 (FIG. 13A) and plural stator teeth 11 (FIG. 13A). The stator windings 9 are wound around a bobbin 14 so as to be disposed between the respective two stator teeth 11. The stator windings 9 are connected to a terminal pin 15a of a printed board 15, and supplied the electric power from the printed board 15.

When the electric power is supplied to the stator windings 9, a magnetic field is generated the plural stator teeth 11 (FIG. 13A). As a result, a rotating magnetic field is generated corresponding to the positions of N poles and S poles of plural magnetic poles 6, and the rotor shaft 4 rotates.

A concrete disposition of plural magnetic poles 6 of the prior art will be elucidated with reference to FIG. 13A, FIG. 13B and FIG. 13C. FIG. 13A is a cross-sectional view, which is taken on line Z—Z of FIG. 12, showing the rotor 3 and the stator core 8 at an instant of the state of the running of the outer-rotor type direct current motor 100. FIG. 13B is an enlarged explanatory view showing one positional relation between plural magnetic poles 6 and plural stator teeth 11 of the outer-rotor type direct current motor 100 shown in FIG. 13A. FIG. 13C is an enlarged explanatory view showing the other positional relation between plural magnetic poles 6 and plural stator teeth 11 of the outer-rotor type direct current motor 100 shown in FIG. 13A.

In FIG. 13A, FIG. 13B and FIG. 13C, illustrations of the rotor shaft 4 and hatching on the rotor 3 and the stator core 8 are omitted for the sake of simplicity of drawings.

In FIG. 13A, plural (e.g., 24 pieces) magnetic poles 6-1–6-24 are disposed on the interior surface of the pipe shaped rotor yoke 5 at even intervals around the axis "C" of the rotor shaft 4 (hereinafter referred to as the axis "C" only) shown by a letter "C" of FIG. 13A. Meanwhile, plural (e.g., 36 pieces) stator teeth 11-1–11-36 are also formed on the stator yoke 10 at even intervals around the axis "C".

Thereby, in the instant of the state shown by FIG. 13A, positional relation between the plural magnetic poles 6 and the plural stator teeth 11 exists in two conditions, for example, as shown by FIG. 13B and FIG. 13C.

As one condition, two stator teeth 11-2 and 11-3 are located symmetrical with respect to the center axis of the magnetic pole 6-2 as shown in FIG. 13B. As the other condition, the center axis of the magnetic pole 6-1 is located overlapping with the center axis of the stator tooth 11-1 as shown in FIG. 13C. In the outer-rotor type direct current motor 100, the above-mentioned two conditions appear alternately with the same numbers.

In the event that the rotor 3 rotates by the angle of 5° from the instant of the state shown by FIG. 13A, the positional relation between the plural magnetic poles 6 and the plural stator teeth 11 corresponds to the above-mentioned two conditions shown by FIG. 13B and FIG. 13C.

As has been elucidated in the above, the cogging torque is caused by the difference of the positional relation between the plural magnetic poles 6 and the plural stator teeth 11. Therefore, this rotation for 5° corresponds to period "Pc" on angle of variation of the cogging torque. This period "Pc" is represented by the below-mentioned equation with regard to the least common multiple "Nc", which is between the number "Nr" of the plural magnetic poles 6 and the number "Ns" of the plural stator teeth 11:

$Pc=360/Nc.$

Now, variation of the cogging torque and distribution of magnetic flux will be shown in FIG. 9 and FIG. 14, respectively. FIG. 9 is a graph showing a waveform of the cogging torque obtained from a computer simulation using a finite element method, wherein the abscissa is graduated with rotation angle of the rotor 3, and the ordinate is graduated with the cogging torque. FIG. 14 is a distribution chart showing a distribution of magnetic flux, which is obtained from the computer simulation using the finite element method, at the instant of the state shown by FIG. 13A.

In this computer simulation, magnetic property of the rotor yoke 5 and the stator core 8 are assumed to have a B-H curve shown in FIG. 10, and magnetic property of the permanent magnet using the plural magnetic poles 6 is assumed to have a B-H curve shown in FIG. 11.

In FIG. 9, a broken line curve 91 shows variation of the cogging torque of the prior art against a rotation angle of the rotor 3. As shown in the broken line curve 91, the cogging torque varies in a waveform similar to a sinusoidal curve.

As shown in FIG. 14, magnetic fluxes gas from the plural magnetic poles 6 to the plural stator teeth 11 without an offset. In the event that the rotor 3 rotates from the instant of the state shown by FIG. 13A, magnetic flux flowing in one of the plural stator teeth 11 increases and decreases according to the rotation of the rotor 3. Thereby, as shown in FIG. 9, the cogging torque varies in the waveform similar to the sine wave by the above-mentioned period "Pc" on angle, for example, of 5°.

As a result, the above-mentioned conventional outer-rotor type direct current motor generates large vibration and noise during the operation. To remove the above-mentioned shortcomings, it is known that one of the plural magnetic poles and the plural stator teeth is skewed by modifying their shapes in the direction of the rotation axis. For example, in the Japanese unexamined utility model application (JIK-KAI) Sho 60-55248, the permanent magnets of the plural magnetic poles are skewed by modifying the respective shapes of the permanent magnets, aiming to offset the cogging torque.

In this the prior art, though the cogging torque can be reduced and offset, an effective magnetic flux decreases. As a result, it becomes impossible to obtain a sufficient output from the direct current motor, and hence an efficiency of the direct current motor lowers.

To prevent the above-mentioned loss of the effective magnetic flux, the Japanese unexamined and published patent application (TOKKAI) SHO 63-31454 showed the disposition of the plural magnetic poles arranged with uneven intervals in the circumferential direction.

FIG. 15 is a perspective view showing a rotor disclosed in the Japanese unexamined and published patent application (TOKKAI) SHO 63-31454. FIG. 16 is a graph showing of a width of the respective N poles and S poles, which are disclosed in the Japanese unexamined and published patent application (TOKKAI) SHO 63-31454, in the circumferential direction. In FIG. 16, the abscissa is graduated with number of the respective positions of N poles and S poles, and the ordinate is graduated with width of the respective N poles and S poles.

In FIG. 15, an inner-rotor 3' has a rotor shaft 4' and n pieces magnetic poles 6' each having a pair of N poles and S poles. Furthermore, N poles and S poles are arranged alternately with the respective widths corresponding to a wave 92 of FIG. 16. A first S pole 6-1'–an n-th N pole 6-n' have widths $P_1$–$P_n$, respectively, and the widths $P_1$–$P_n$ form a waveform of the wave 92 by taking the n pieces magnetic poles 6' in order. Thus, in this prior art, the plural magnetic poles 6' are arranged with the uneven intervals in the circumferential direction by means of taking the variation of the widths of the N poles and S poles. Thereby, it is intended to reduce the cogging torque without the loss of the effective magnetic flux.

However, this prior art merely suggests that the N poles and S poles were arranged with the uneven intervals in the circumferential direction without disclosing the necessary way of disposing with concrete values of the uneven intervals. Therefore, it is impossible to dispose the plural magnetic poles in order to reduce the cogging torque.

Furthermore, in this prior art, though the cogging torque is produced by the difference of the positional relations between the plural magnetic poles and the plural stator teeth, there is no consideration for the number "Ns" of the plural stator teeth. Therefore, even if the plural magnetic poles are arranged as the wave 92 of FIG. 16, the cogging torque is changed by the number "Ns" of the plural stator teeth. In such case, there is a fear that the cogging torque increases, and the effective magnetic flux decreases.

Theoretically, the most suitable and the concrete shift angle value "Δθs" of the uneven interval angles is introduced by the aforementioned period "Pc" on angle. That is, the value "Δθs" is equal to dividend of the period "Pc" on angle by the number "Nr" of the plural magnetic poles as shown by the following equation:

$$\Delta\theta s = Pc/Nr = 360/(Nc \cdot Nr).$$

However, this value "Δθs" is not practical in the following reason:

The value "Δθs" takes an extremely small value, for example, the angle of 0.208° (=5/24).

Therefore, there is a problem that it is difficult in actual use to dispose the respective plural magnetic poles with this uneven interval value "Δθs".

OBJECT AND SUMMARY OF THE INVENTION

The object of the present invention is to provide a direct current motor that can solve the aforementioned problems.

In order to achieve the above-mentioned object, a direct current motor in accordance with the present invention comprises:

a stator including a stator core, the stator core having Ns pieces of stator teeth; and a rotor including Nr pieces of magnetic poles, the magnetic poles facing the stator teeth, and each of the magnetic poles being disposed at such angular locations around the rotor that shift by predetermined shift angles from even angle-disposed reference angular positions in circumferential direction, the even angle-disposed reference angular positions being defined by dividing the circumference by even angles around an axis of the rotor;

the shift angles being in a range shown by an expression concerning the least common multiple Nc, which is between the Nr and the Ns;

$-180/Nc \leq$ shift angles $\leq +180/Nc$, wherein signs "–" and "+" in the expression show a shift direction of the magnetic poles from the even angle-disposed reference angular positions in the circumferential direction of the rotor.

According to the above-mentioned direct current motor, a cogging torque can be reduced by eliminating from the loss of an effectively magnetic flux. Thereby, vibrations and noises during the operation can be decreased, and large output and high efficiency are obtained.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention is described with reference to the accompanying drawings.

[Embodiment 1]

Figure 1:
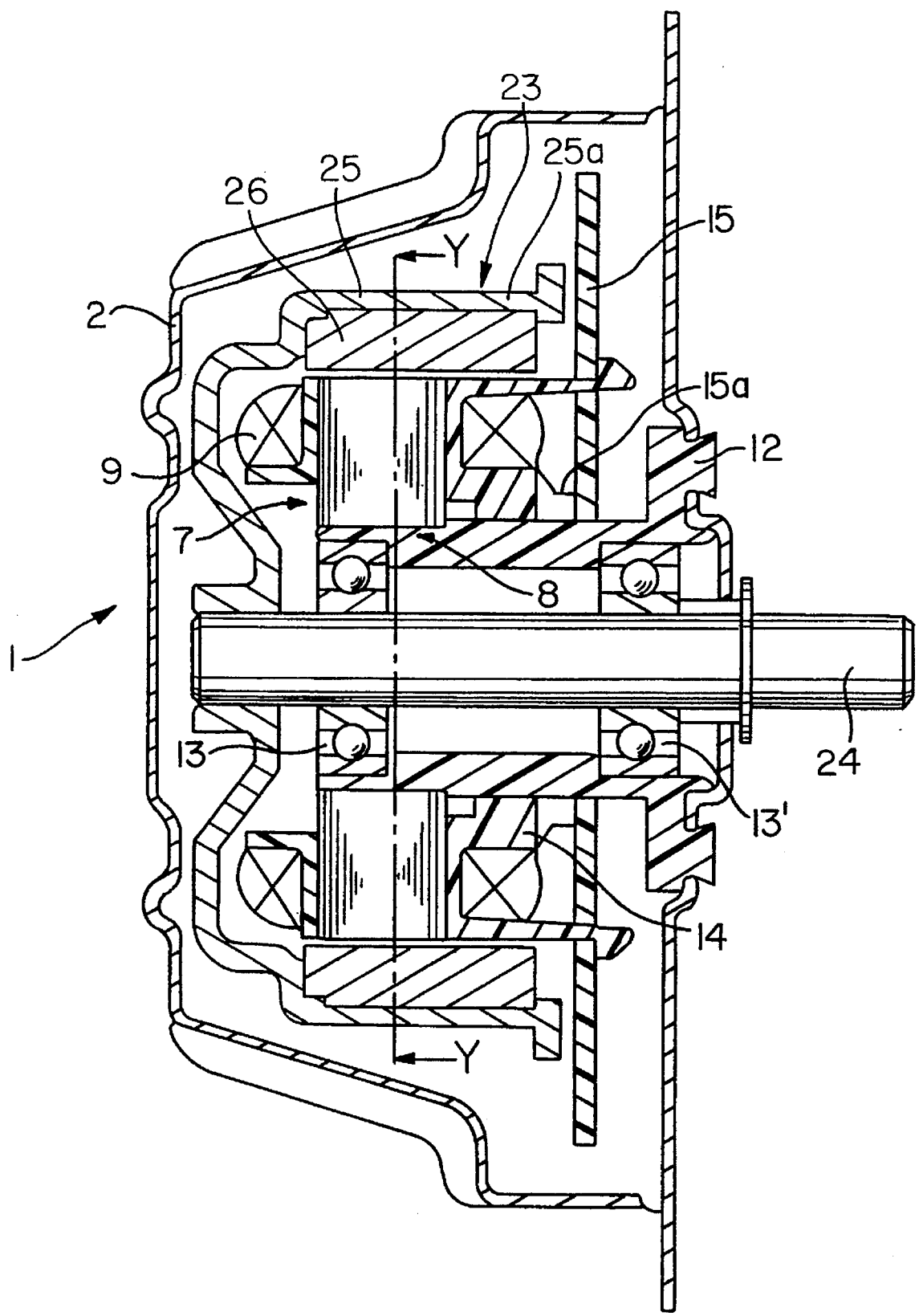
FIG. 1 is a sectional view of an outer-rotor type direct current motor 1 embodying the present invention.

FIG. 1 is a sectional view of an outer-rotor type direct current motor 1 embodying the present invention.

In FIG. 1, a bracket 2 is made of a metal, such as a steel plate, and contains a rotor 23 and a stator 7.

The rotor 23 comprises a rotor shaft 24, which is held via bearings 13, 13' by a housing 12, a pipe shaped rotor yoke 25, which is fixed to one end of the rotor shaft 24, and plural magnetic poles 26 which is fixed to the rotor yoke 25. The rotor shaft 24 is made of a ferro-magnetic metal, such as an electromagnetic iron, and rotatably held to the bracket 2 so that the other end part of the rotor shaft 24 is protruded from the bracket 2. The rotor yoke 25 is made of the ferro-magnetic metal, such as the electromagnetic steel plate, and one end part of the rotor yoke 25 is fixed to one end part of the rotor shaft 24 by welding or shrinkage fit. Furthermore, plural recesses 25a are formed on the inner surface of the other part of the rotor yoke 25 in order to fix the plural magnetic poles 26 in the circumferential direction.

The plural magnetic poles 26 are poles of a permanent magnet having N poles and S poles. The permanent magnet is fixed in the respective recesses 25a of the rotor yoke 25 by an adhesive at the location to face the stator 7 with a narrow gap therebetween. The plural magnetic poles 26 consist of a main part 26a (FIG. 5) for actuating the rotor 23 and a sensor part 26b (FIG. 5) for detecting a position of the rotor 23.

Figure 2:
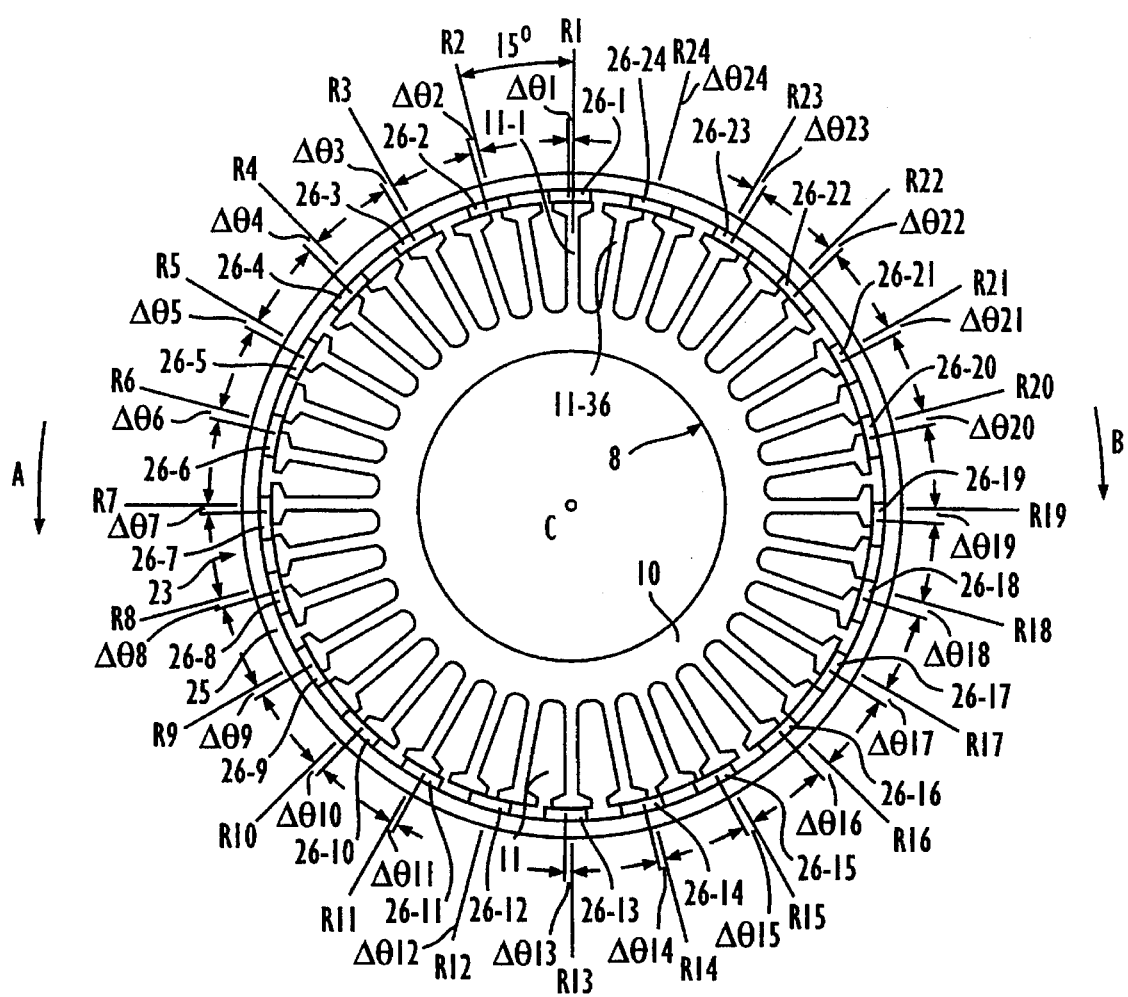
FIG. 2 is a cross-sectional view, which is taken on line Y—Y of FIG. 1, showing the rotor 23 and the stator core 8 at an instant of the state of the running of the outer-rotor type direct current motor 1.

The stator 7 comprises a stator core 8 and stator windings 9. The stator core 8 is made of the ferro-magnetic metal, such as the electromagnetic steel plate, and consists of a stator yoke 10 (FIG. 2) and plural stator teeth 11 (FIG. 2). The stator windings 9 are wound around a bobbin 14 so as to be disposed between the respective two stator teeth 11. The stator windings 9 are connected to a terminal pin 15a of a printed board 15, and supplied the electric power from the printed board 15.

When the electric power is supplied to the stator windings 9, a magnetic field is generated the plural stator teeth 11 (FIG. 2). As a result, a rotating magnetic field is generated corresponding to the positions of N poles and S poles of plural magnetic poles 26, and the rotor shaft 24 rotates.

Figure 3:
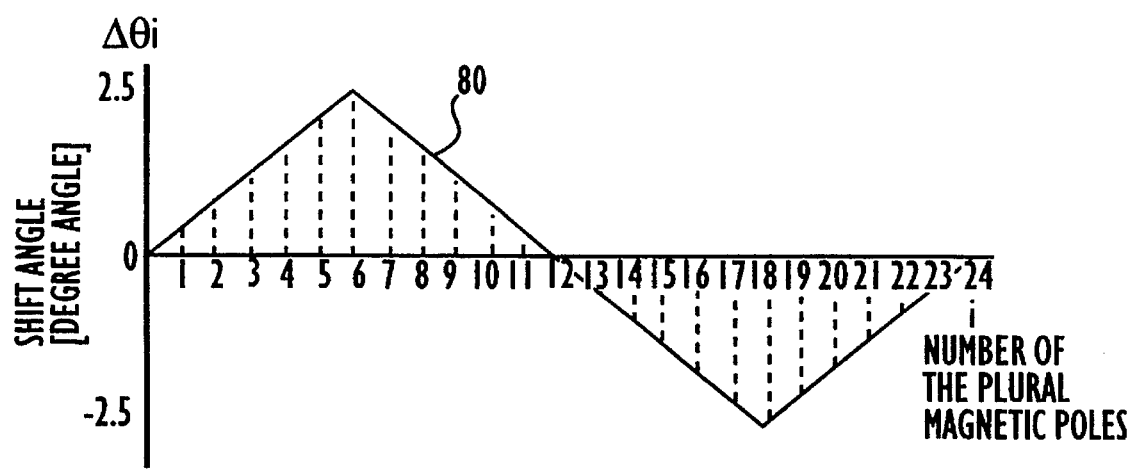
FIG. 3 is a graph showing a waveform of an angle around a shaft at the respective plural magnetic poles, which are described in a first embodiment of the present invention, with respect to the respective difference positions defined by even angles around the axis of a rotor shaft.

A concrete disposition of plural magnetic poles 26 of the present invention will be elucidated with reference to FIG. 2 and FIG. 3. FIG. 2 is a cross-sectional view, which is taken on line Y—Y of FIG. 1, showing the rotor 23 and the stator core 8 at an instant of the state of the running of the outer-rotor type direct current motor 1. FIG. 3 is a graph showing a waveform of an angle around a shaft at the respective plural magnetic poles, which are described in a first embodiment of the present invention, with respect to the respective difference positions defined by even angles around the axis of a rotor shaft.

In FIG. 2, illustrations of the rotor shaft 24 and hatching on the rotor 23 and the stator core 8 are omitted for the sake of simplicity of drawings.

In FIG. 2, plural (e.g., 36 pieces) stator teeth 11-1–11-36 are formed on the stator yoke 10 at even angles around the axis "C" of the rotor shaft 24 (hereinafter referred to as the axis "C" only) shown by a letter "C" of FIG. 2.

On the other hand, plural (e.g., 24 pieces ) magnetic poles 26-1–26-24 are disposed at such angular locations around the shaft that shift by predetermined shift angles $\Delta\theta_1$–$\Delta\theta_{24}$ from the even angle-disposed reference angular positions R1–R24 in circumferential direction. The even angle-disposed reference angular positions R1–R24 are defined by dividing the circumference by even angles (namely, 15° each) around the axis "C" of the shaft, respectively.

Furthermore, a first, a second–an 11-th magnetic poles 26-1, 26-2–26-11 are disposed shifted anticlockwise as shown by an arrow "A" of FIG. 2 by the shift angle $\Delta\theta_1$, $\Delta\theta_2$ –$\Delta\theta_{11}$ from the reference angular positions R1–R11, respectively. Contrarily, a 13-th–23-rd magnetic poles 26-13–26-23 are disposed shifted clockwise as shown by an arrow "B" of FIG. 2 by the shift angle $\Delta\theta_{13}$–$\Delta\theta_{23}$ from the reference angular positions R13–R23, respectively. Centers of a 12-th and a 24-th magnetic poles 26-12 and 26-24 are disposed just on the respective reference angular positions R12 and R24 as shown in FIG. 2.

Furthermore, any shift angle $\Delta\theta i$ exists in a following range shown by the following expression concerning the least common multiple "Nc", which is between the number "Nr" of the plural magnetic poles 26 and the number "Ns" of the plural stator teeth 11:

$$-2.5=-180/Nc \leq \Delta\theta i \leq +180/Nc=+2.5,$$

wherein, signs "−" and "+" of this shift angle $\Delta\theta i$ show a shift direction of a magnetic pole 26-i from a reference angular position Ri in the circumferential direction. For example, a plus sign indicates that the magnetic pole 26-i is disposed shifted anticlockwise, and a minus sign indicates that the magnetic poles 26-i is disposed shifted clockwise.

Furthermore, as shown in FIG. 3, the shift angle $\Delta\theta i$ has a substantially triangular wave-type relation curve 80 with regard to the linear alignment of the plural magnetic poles 26-1–26-24 in order. This triangular wave-type relation curve 80 is of a periodic function, wherein its period is as large as a fraction by an integer times of period on angle of rotation of the rotor 23, for instance, one rotation (360°) of the rotor 23. The triangular wave-type relation curve 80 is represented by the below-mentioned expressions:

$$1 \leq i \leq Nr/4=6 \quad \Delta\theta i=720 \cdot i/(Nc \cdot Nr) \quad \text{(i)}$$

$$6=Nr/4 \leq i \leq 3 \cdot Nr/4=18 \quad \Delta\theta i=360/Nc-720 \cdot i/(Nc \cdot Nr) \quad \text{(ii)}$$

$$18=3 \cdot Nr/4 \leq i \leq Nr=24 \quad \Delta\theta i=-720/Nc+720 \cdot i/(Nc \cdot Nr) \quad \text{(iii)}$$

Apart from the aforementioned explanation, wherein the plural magnetic poles 26 are disposed shifted by the shift angle $\Delta\theta i$ so as to form triangular wave-type relation curve 80 for the shift angle $\Delta\theta i$ as shown by the above-mentioned three expressions, an alternative construction may be such that the plural magnetic poles 26 are disposed shifted with the shift angle $\Delta\theta i$ so as to form sinusoidal wave-type relation for the shift angle $\Delta\theta i$ defined by the equation, for example, $$\Delta\theta i=180/Nc \cdot \sin(360 \cdot i/Nr).$$

Figure 6:
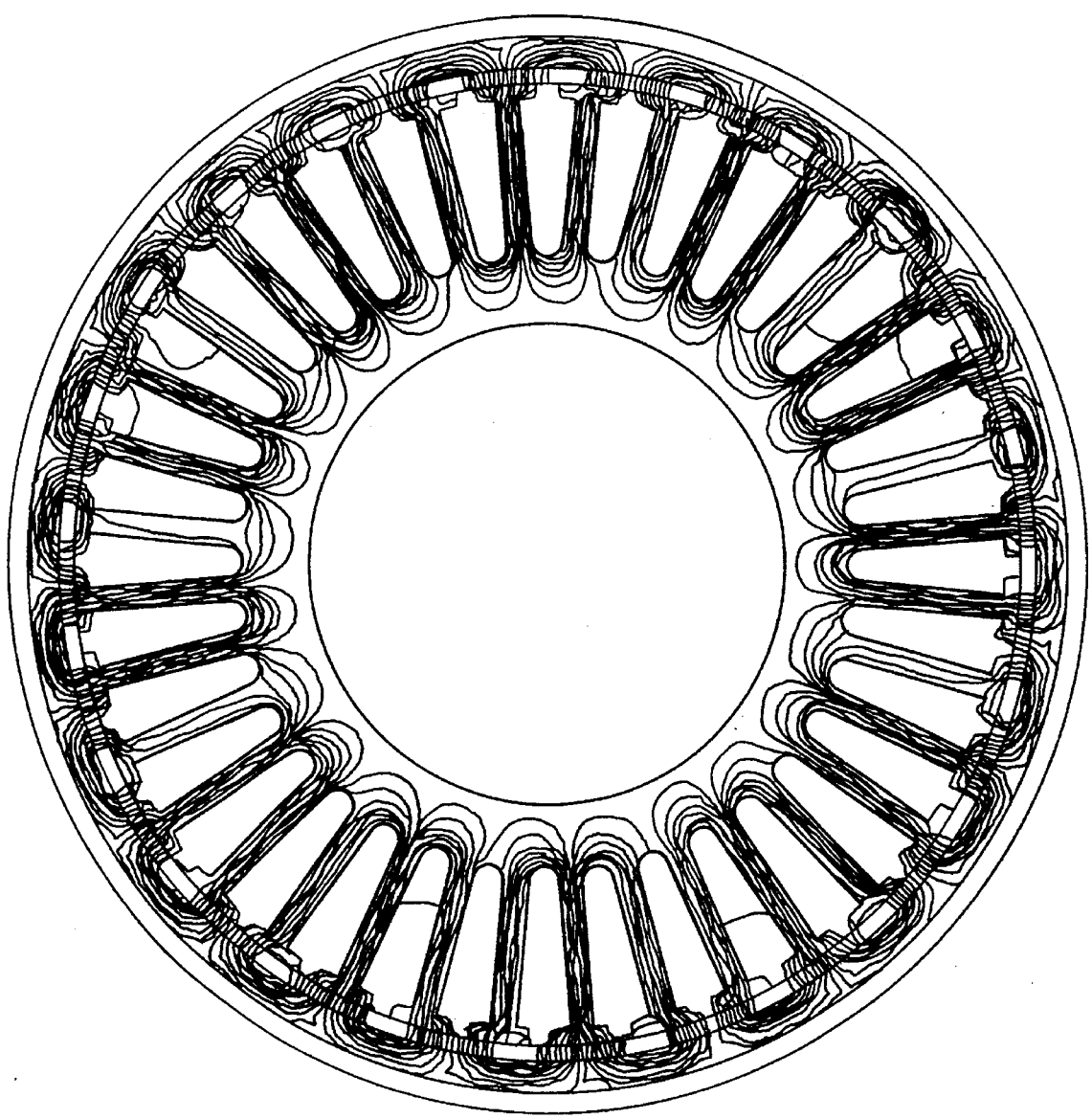
FIG. 6 is a distribution chart showing a distribution of magnetic flux, which is obtained from the computer simulation using the finite element method, at the instant of the state shown by FIG. 2.
Figure 9:
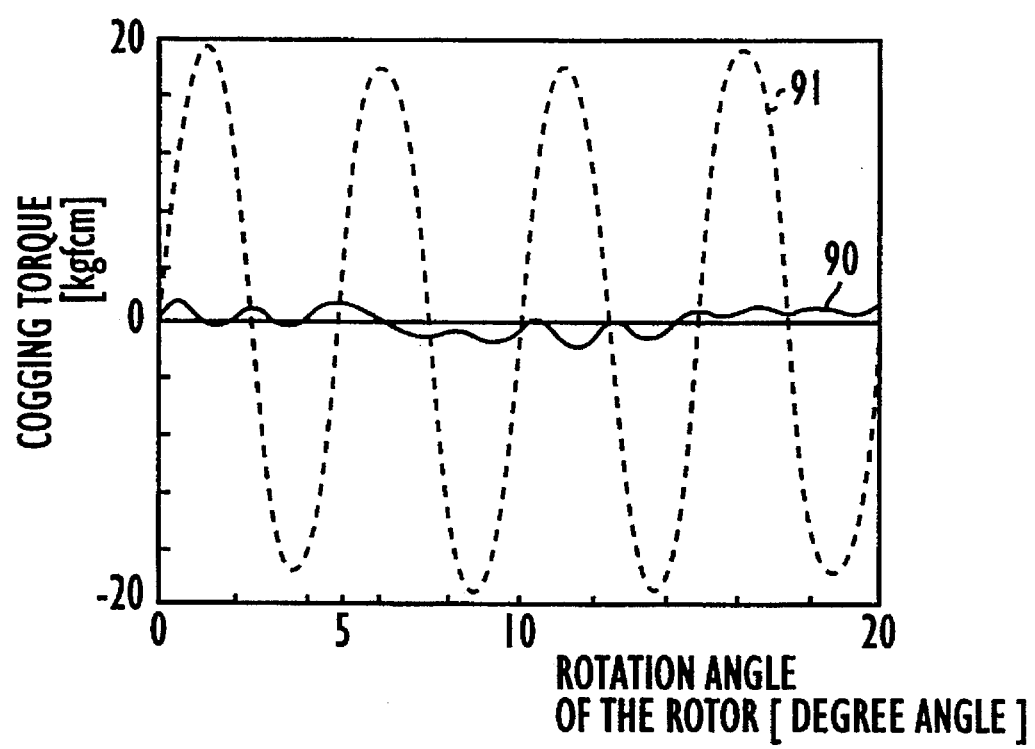
FIG. 9 is a graph showing a waveform of the cogging torque obtained from a computer simulation using a finite element method.

Now, variation of the cogging torque and distribution of magnetic flux will be shown in FIG. 9 and FIG. 6, respectively. FIG. 9 is a graph showing a waveform of the cogging torque obtained from a computer simulation using a finite element method. FIG. 6 is a distribution chart showing a distribution of magnetic flux, which is obtained from the computer simulation using the finite element method, at the instant of the state shown by FIG. 2.

Figure 10:
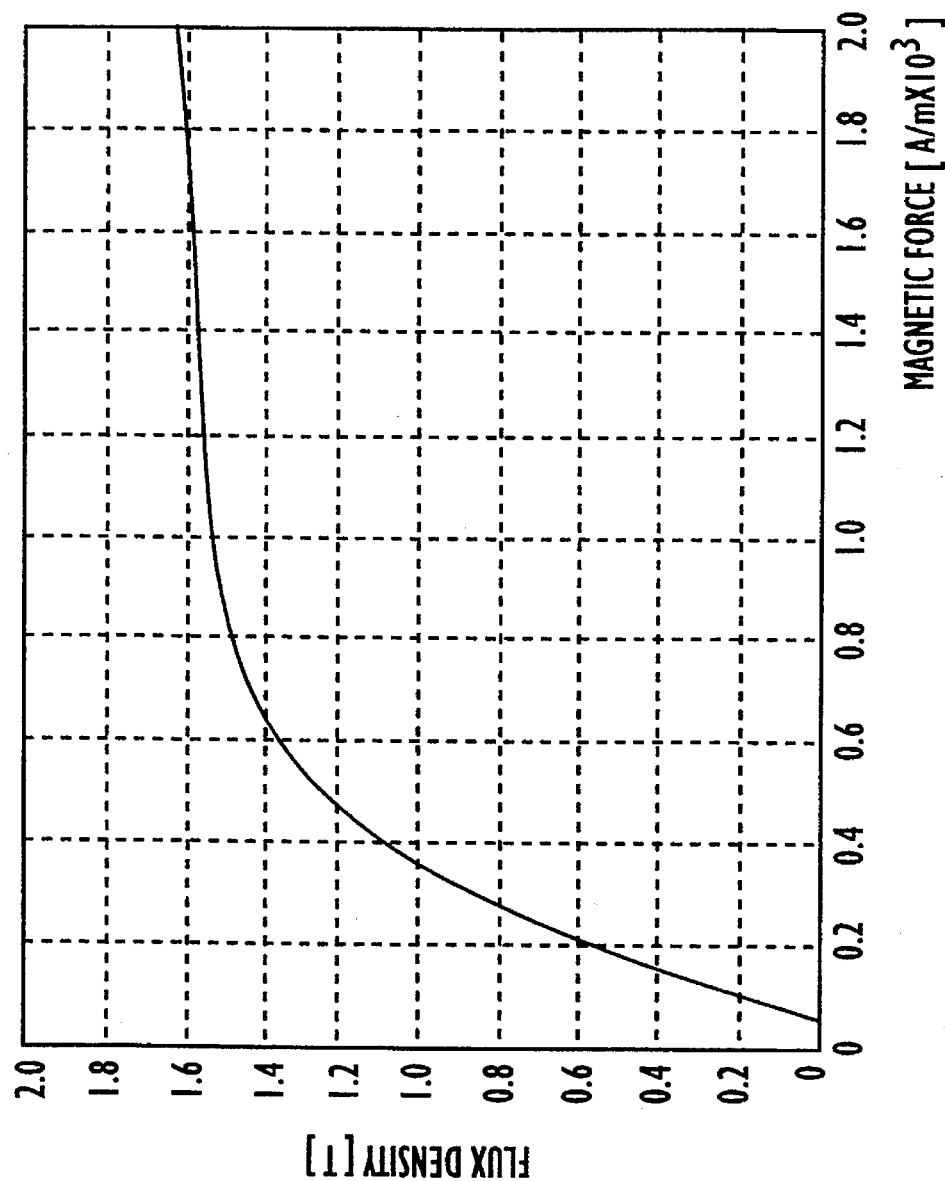
FIG. 10 is a graph showing a B-H curve of the rotor yoke and the stator core applied to a computer simulation.
Figure 11:
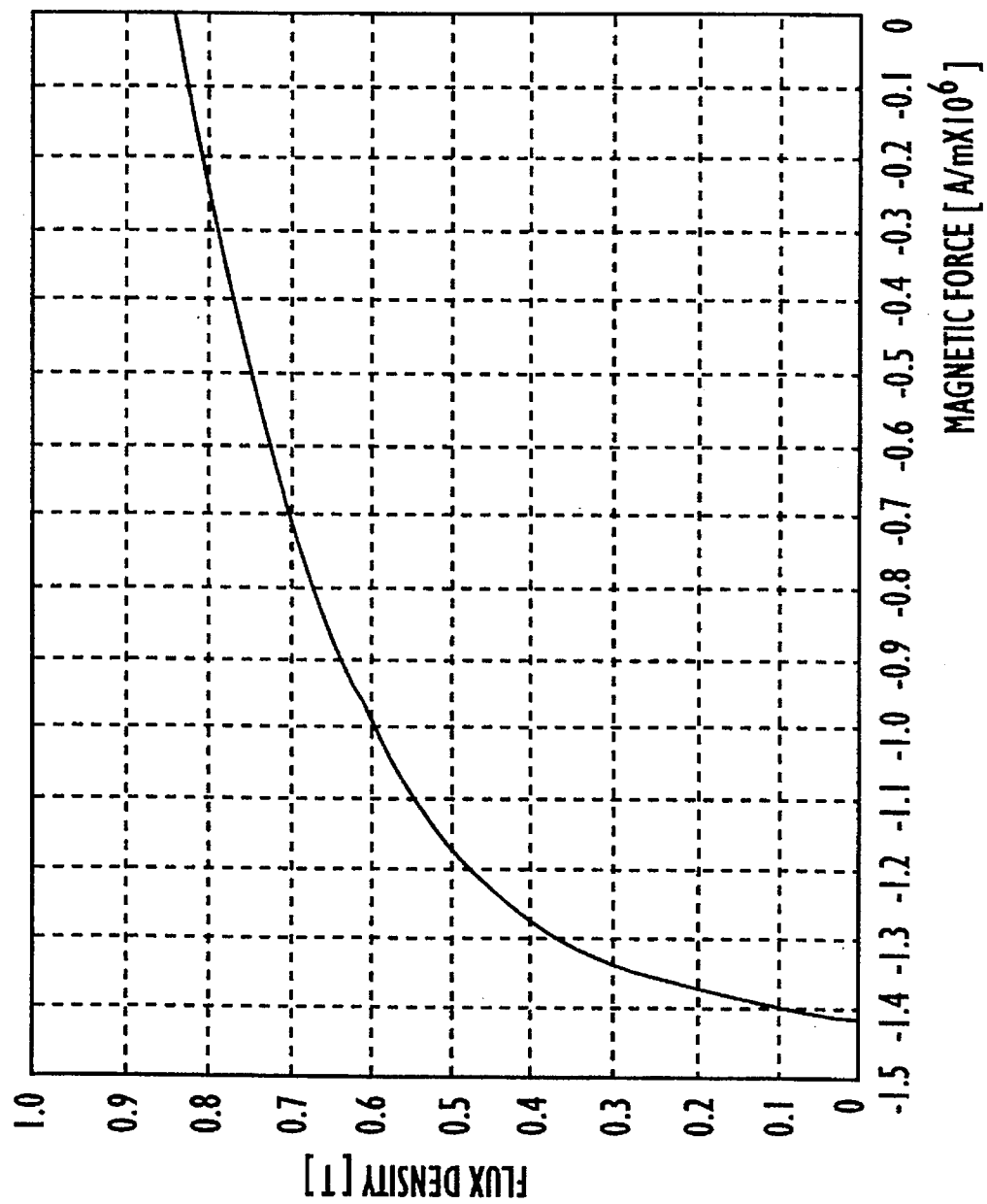
FIG. 11 is a graph showing a B-H curve of the permanent magnet, which is used in the plural magnetic poles, applied to a computer simulation.
Figure 12:
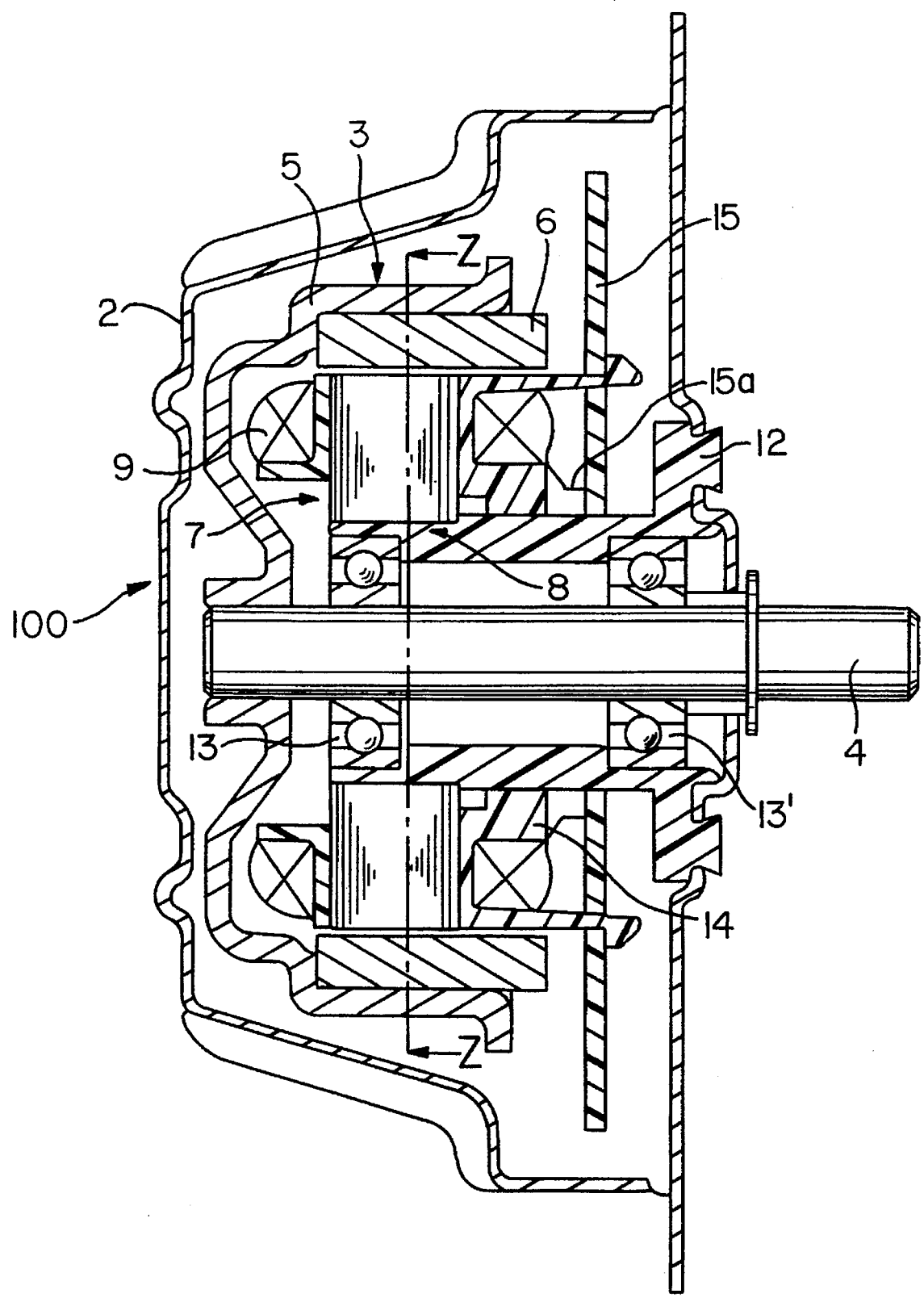
FIG. 12 is a sectional view of an outer-rotor type direct current motor of the prior art.
Figure 13A:
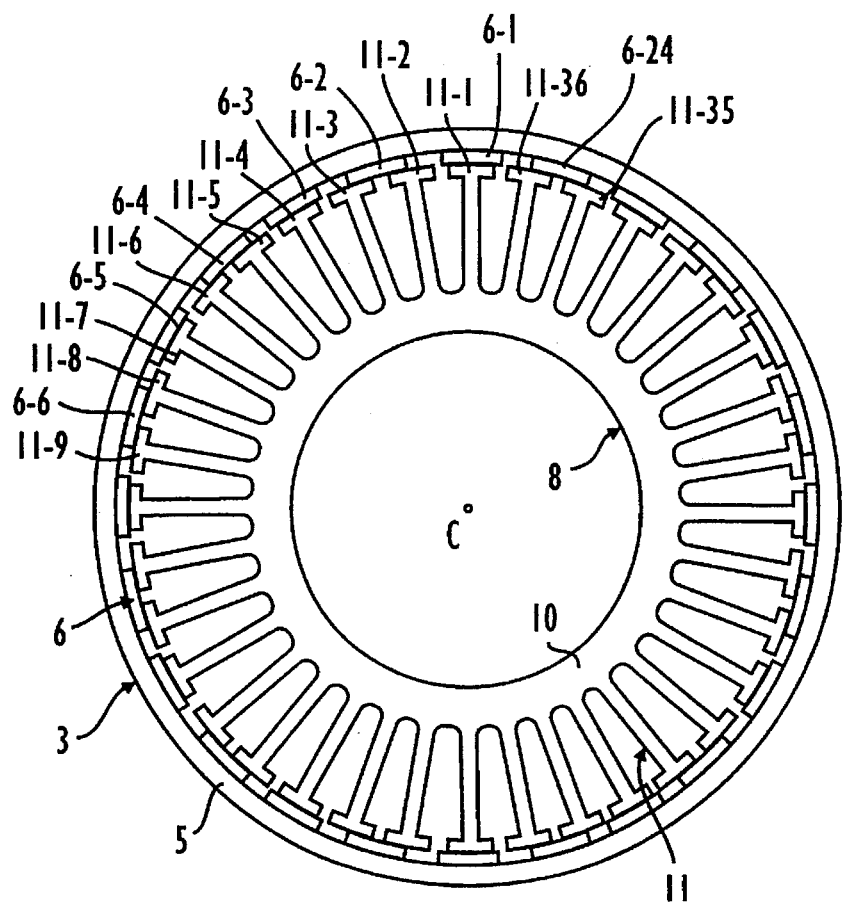
FIG. 13A is a cross-sectional view, which is taken on line Z—Z of FIG. 12, showing the rotor 3 and the stator core 8 at an instant of the state of the running of the outer-rotor type direct current motor 100.
Figure 13B:
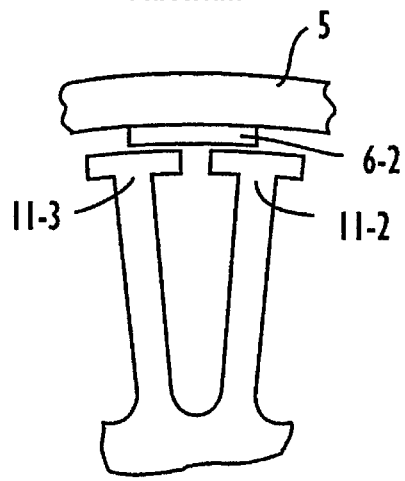
FIG. 13B is an enlarged explanatory view showing one positional relation between plural magnetic poles 6 and plural stator teeth 11 of the outer-rotor type direct current motor 100 shown in FIG. 13A.
Figure 13C:
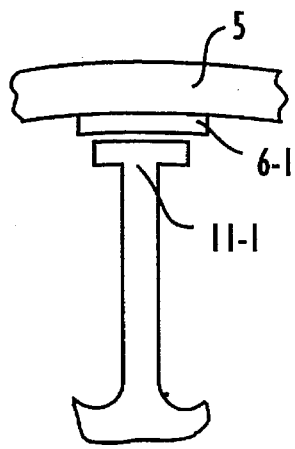
FIG. 13C is an enlarged explanatory view showing the other positional relation between plural magnetic poles 6 and plural stator teeth 11 of the outer-rotor type direct current motor 100 shown in FIG. 13A.
Figure 14:
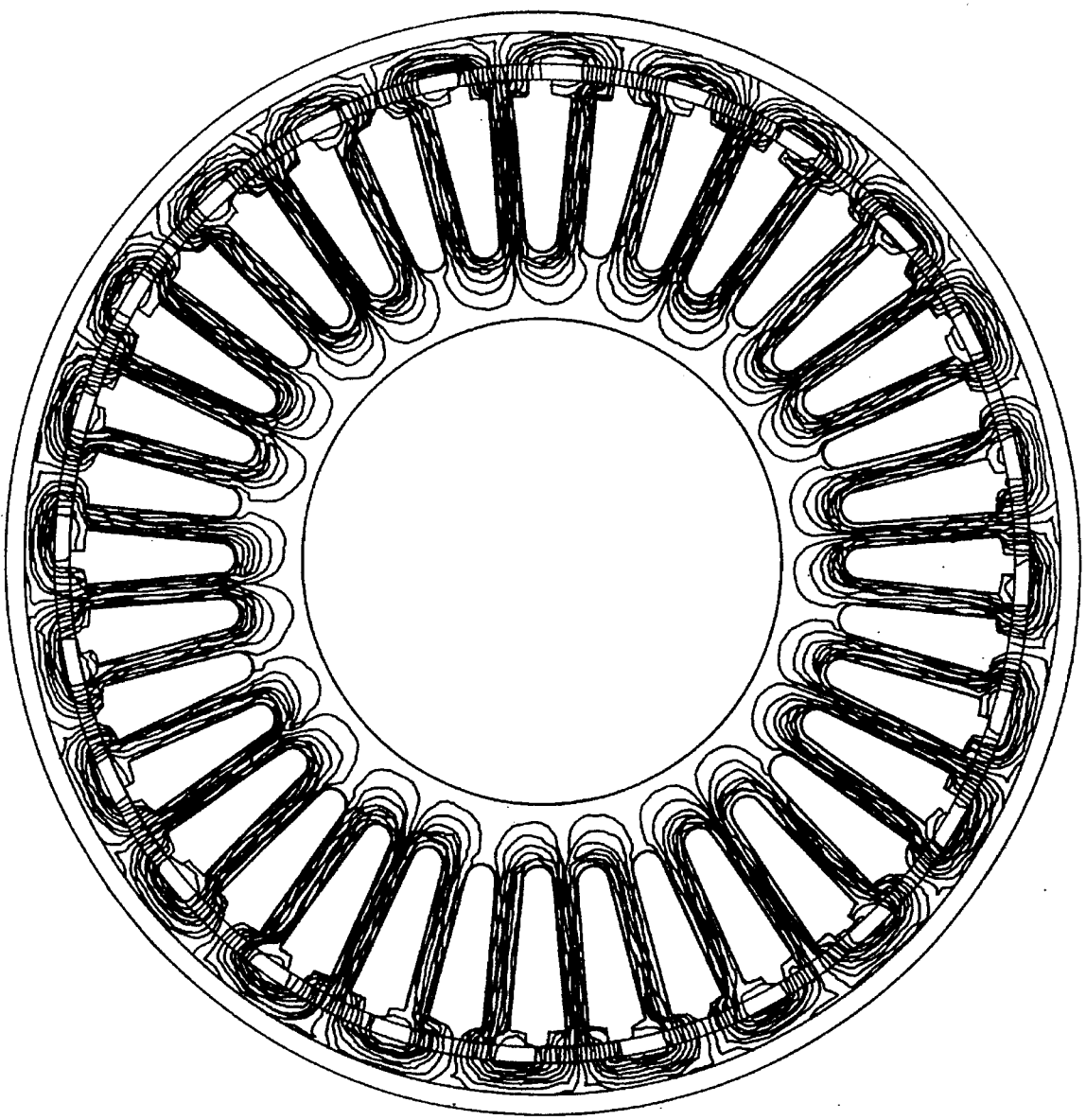
FIG. 14 is a distribution chart showing a distribution of magnetic flux, which is obtained from the computer simulation using the finite element method, at the instant of the state shown by FIG. 13A.
Figure 15:
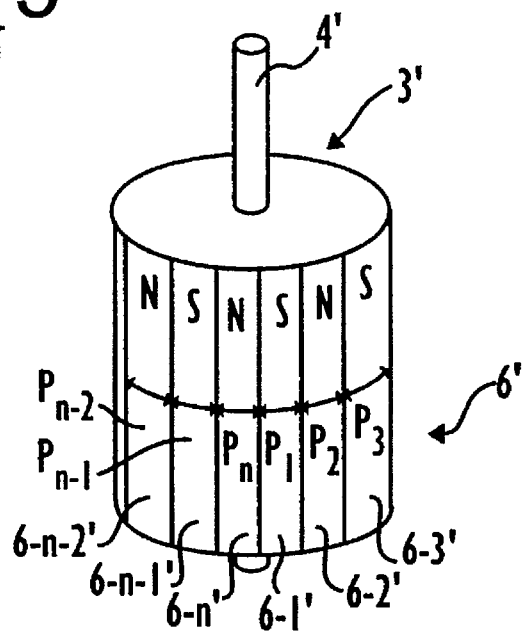
FIG. 15 is a perspective view showing a rotor disclosed in the Japanese unexamined and published patent application (TOKKAI) SHO 63-31454.
Figure 16:
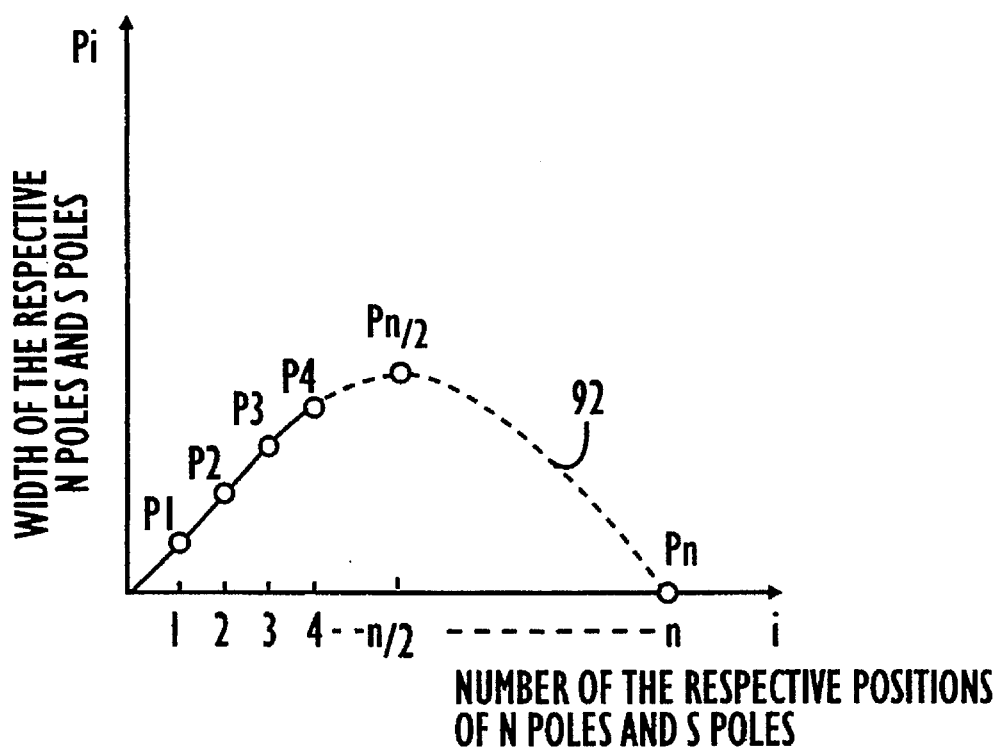
FIG. 16 is a graph showing of a width of the respective N poles and S poles, which are disclosed in the Japanese unexamined and published patent application (TOKKAI) SHO 63-31454, in the circumferential direction.

In this computer simulation, magnetic property of the rotor yoke 25 and the stator core 8 are assumed to have a B-H curve shown in FIG. 10, and magnetic property of the permanent magnet using the plural magnetic poles 26 is assumed to have a B-H curve shown in FIG. 11.

In FIG. 9, a solid line curve 90 shows variation of the cogging torque of the present invention against a rotation angle of the rotor 23. The curve of the cogging torque is substantially of a sinusoidal curve as shown in the solid line curve 90. As shown by the solid line curve 90 and the prior art cogging torque of the broken line curve 91, frequency of variation of the cogging torque of the present invention is apparently larger than that of the prior art shown by the broken line curve 91.

For the reason, in each-other adjacent two magnetic poles, a maximum value of a shift angle is under 360/Nc (namely, 5°), because the shift angle $\Delta\theta i$ exists in the aforementioned range (−180/Nc≤$\Delta\theta i$≤+180/Nc). As has been elucidated in the above the prior art, the 360/Nc represents the period on angle "Pc" of the cogging torque against the rotation of the rotor in case the plural magnetic poles are disposed with even angles around the axis "C". Thereby, the cogging torque of the present invention varies with shorter period than that of the prior art, and that the maximum value of the cogging torque of the present invention is under about 1/10, of the prior art, as are apparent from the comparison of the solid line curve 90 and the broken line curve 91.

As shown in FIG. 6, the amounts of the magnetic flux are different from each other in the respective plural stator teeth 11-1–11-36.

The reason of such difference is that, the plural magnetic poles 26-1–26-24 are disposed shifted by the respective shift angles $\Delta\theta 1$–$\Delta\theta 24$ so as to form triangular wave-type relation curve 80 for the shift angles $\Delta\theta 1$–$\Delta\theta 24$. Thereby, respective forces exerted on the respective plural magnetic poles 26-1–26-24 are almost equal during one rotation of the rotor 23. As a result, it is possible to reduce the cogging torque without the loss of the effective magnetic flux.

Furthermore, as has been elucidated in the above, the shift angles $\Delta\theta i$ are in the aforementioned range defined by the number "Nr" of the plural magnetic poles 26 and the number "Ns" of the plural stator teeth 11. Thereby, even if each of the number "Nr" and the number "Ns" takes different value from that of the first embodiment, it is always possible to decrease the cogging torque.

Figure 4:
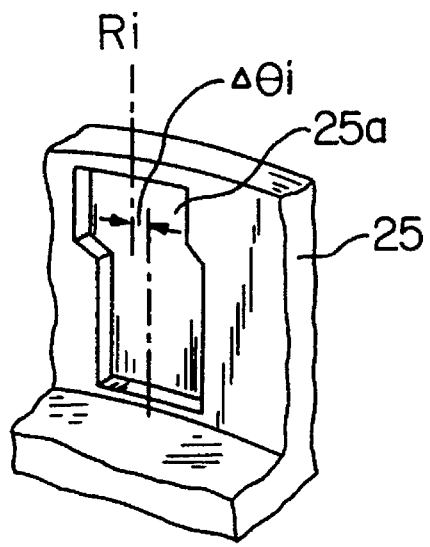
FIG. 4 is an enlarged perspective view showing a recess, which is formed on the inner surface of the rotor yoke of the first embodiment of the present invention, for mounting the magnetic pole.
Figure 5:
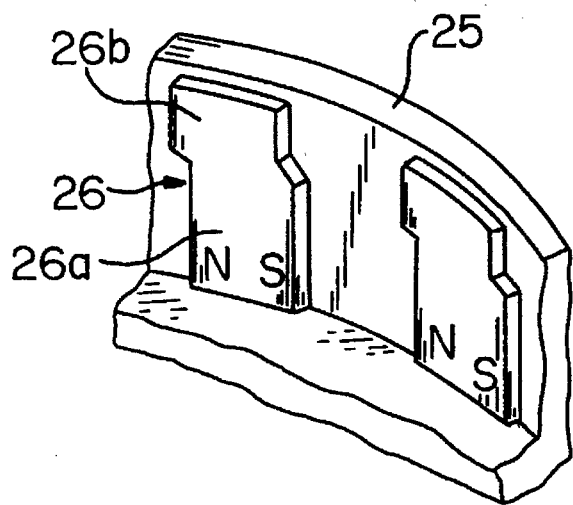
FIG. 5 is an enlarged perspective view showing the permanent magnet, which is fixed to the recess as the magnetic pole, of the first embodiment of the present invention.

A concrete mounting construction of the plural magnetic poles 26 will be elucidated with reference to FIG. 4 and FIG. 5. FIG. 4 is an enlarged perspective view showing a recess, which is formed on the inner surface of the rotor yoke of the first embodiment of the present invention, for mounting the magnetic pole. FIG. 5 is an enlarged perspective view showing the permanent magnets, which are fixed in the recess as the magnetic poles, of the first embodiment of the present invention.

As shown in FIG. 4 and FIG. 5, each of the plural magnetic poles 26 consists of the main part 26a and the sensor part 26b formed continuous with the main part 26a integrally. The main part 26a is used for actuating the rotor 23 as the magnetic pole, and the main parts 26a are disposed shifted with the aforementioned shift angle $\Delta\theta i$. The sensor part 26b is used for detecting a position of the rotor 23, and the sensor parts 26b are disposed with the even angles. Each of the plural recesses 25a is formed in a polygonal shape on the inner surface of the rotor yoke 25 so as to receive and fix the main part 26a and the sensor part 26b therein.

Since the plural recesses 25a are formed on the inner surface of the rotor yoke 25, it is possible to assemble the plural magnetic poles 26 easily.

Apart from the aforementioned explanation, wherein the magnetic pole 26 is integrally formed with the main part 26a and the sensor part 26b, an alternative construction may be such that the sensor part 26b is formed separated from the main part 26a.

A Modified Version of the Preferred Embodiment

Figure 7A:
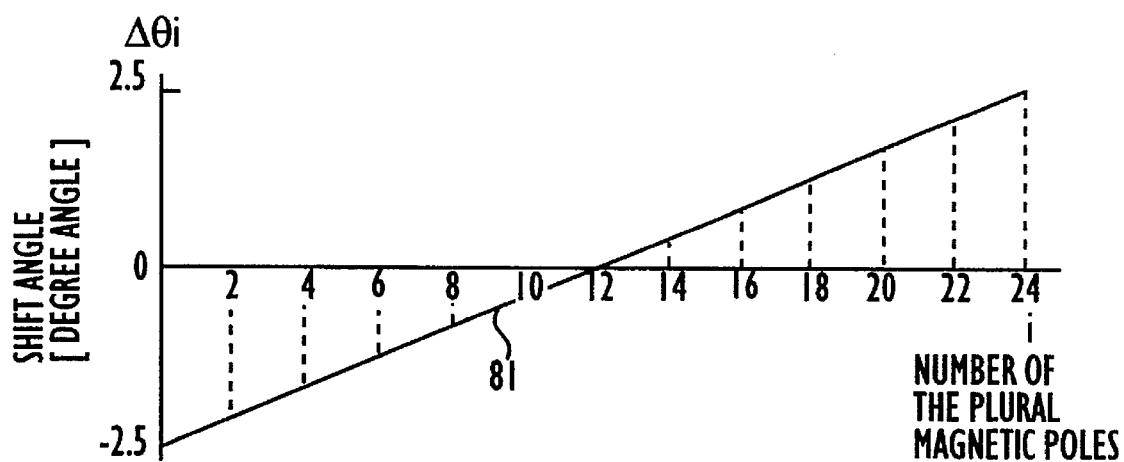
FIG. 7A is a graph showing a waveform of an angle around a shaft at the respective plural magnetic poles of the even numbers, which are a modified version of the first embodiment, with respect to the respective difference positions defined by even angles around the axis of a rotor shaft.
Figure 7B:
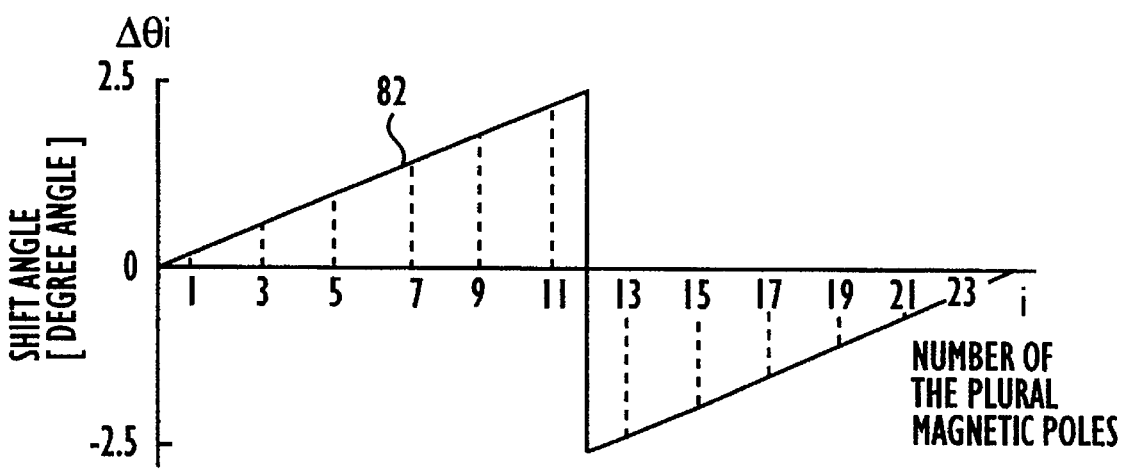
FIG. 7B is a graph showing a waveform of an angle around a shaft at the respective plural magnetic poles of the odd numbers, which are a modified version of the first embodiment, with respect to the respective difference positions defined by even angles around the axis of a rotor shaft.

A modified version of the preferred embodiment will be elucidated with reference to FIG. 7A and FIG. 7B. In FIG. 7A, the abscissa is graduated with number of the plural magnetic poles, and the ordinate is graduated with the shift angle $\Delta\theta i$ around the axis of the shaft at the respective plural magnetic poles of the even numbers. In FIG. 7B, the abscissa is graduated with number of the plural magnetic poles, and the ordinate is graduated with the shift angle Δθi around the axis of the shaft at the respective plural magnetic poles of the odd numbers. In this embodiment, the manner of the variation, i.e., waveform of the curve in FIG. 7A or FIG. 7B are modified from the first embodiment. In this modified version, the same components and parts as those of the preferred embodiment are designated by the same numerals, and corresponding descriptions similarly apply. Therefore, the descriptions will be made mainly on the modified parts from the preferred embodiment.

In this modified version, the plural magnetic poles 26i of the even numbers are disposed shifted with the shift angle Δθi from the reference angular positions Ri so as to form sawtooth wave-type relation curve 81 for the shift angle Δθi. The sawtooth wave-type relation curve 81 is represented by the following expression;

$$0<i\leq Nr=24;\ \text{the even numbers}\ \Delta\theta i=360\cdot i/(Nc\cdot Nr)-180/Nc \quad \text{(iv)}$$

Furthermore, the plural magnetic poles 26i of the odd numbers are disposed shifted with the shift angle Δθi from the reference angular position Ri so as to form sawtooth wave-type relation curve 82 for the shift angle Δθi. The sawtooth wave-type relation curve 82 is represented by the following two expressions;

$$0<i<Nr/2=12;\ \text{the odd numbers}\ \Delta\theta i=360\cdot i/(Nc\cdot Nr). \quad \text{(v)}$$

$$12=Nr/2<i<Nr=24;\ \text{the odd numbers}\ \Delta\theta i=360\cdot i/(Nc\cdot Nr)-360/Nc \quad \text{(vi)}$$

In the first embodiment, the first, the second–the 11-th magnetic poles 26-1, 26-2–26-11 are disposed shifted anticlockwise with the respective shift angles Δθ1, Δθ2–Δθ11, and the 13–th the 23-rd magnetic poles 26-13–26-23 are disposed shifted clockwise with the respective shift angles Δθ13–Δθ23. Thus, each-other adjacent two magnetic poles are disposed shifted in a same shift direction each other either in anticlockwise or clockwise. Thereby, it is afraid that the swell of the rotor in a low frequency is generated from the outer-rotor type direct current motor 1 during the operation.

In this modified version, each-other adjacent two magnetic poles are disposed shifted in the opposite shift direction from each-other as shown in FIG. 7A and FIG. 7B. Thereby, the amount of the forces, which are exerted on the respective each-other adjacent two magnetic poles, can be offset and decreased. As a result, it is possible to prevent the swell of the rotor.

[Embodiment 2]

Figure 8:
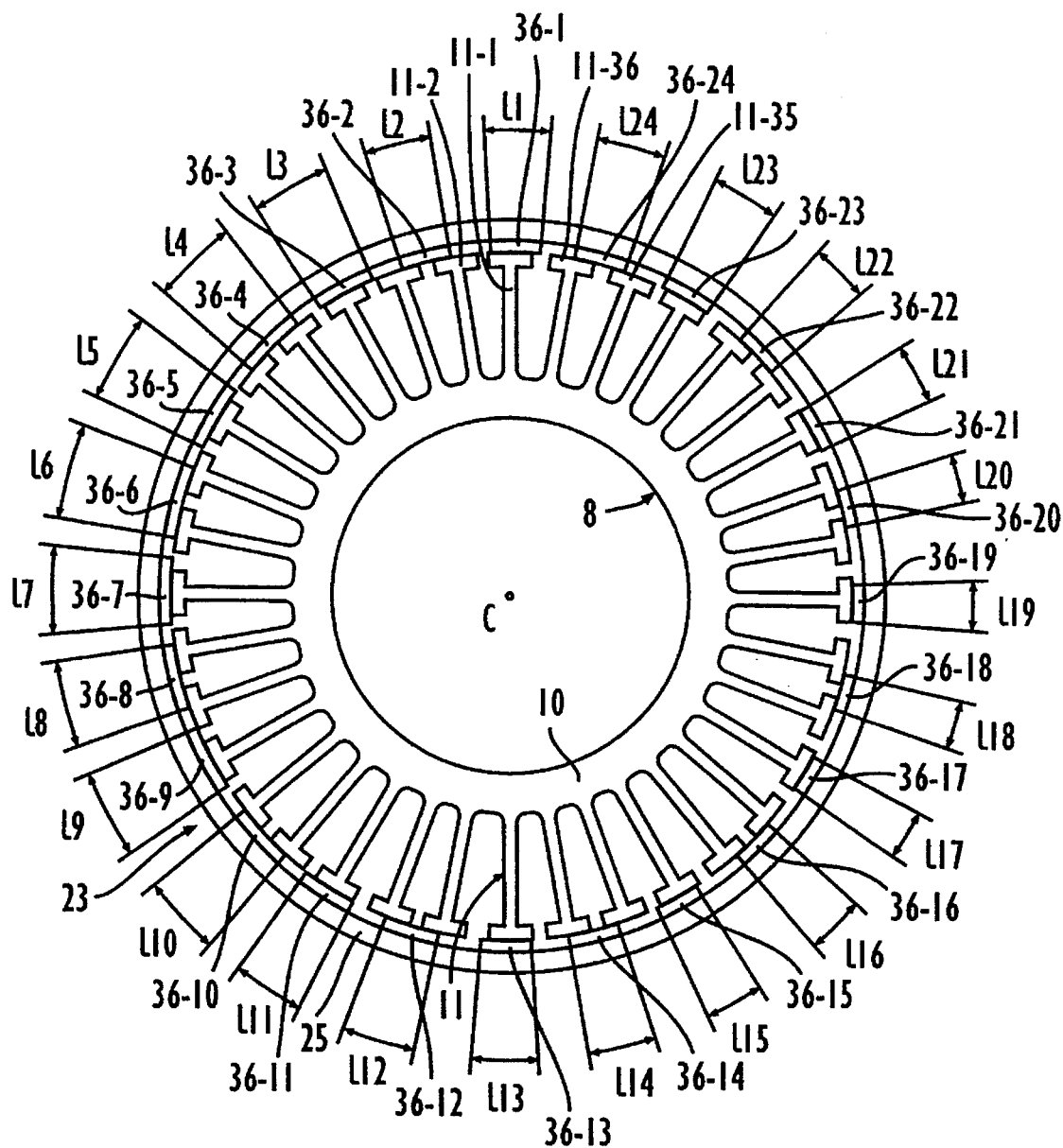
FIG. 8 is a cross-sectional view, which is taken on line Y—Y of FIG. 1, showing the rotor 23 and the stator core 8 at the instant of the state of the running of the outer rotor type current motor 1 of a second embodiment.

FIG. 8 is a cross-sectional view, which is taken on line Y—Y of FIG. 1, showing the rotor 23 and the stator core 8 at the instant of the state of the running of the outer rotor type current motor 1 of a second embodiment.

In this second embodiment, the same components and parts as those of the preferred embodiment are designated by the same numerals, and corresponding descriptions similarly apply. Therefore, the descriptions will be made mainly on the different parts from the preferred embodiment.

In FIG. 8, plural magnetic poles 36-1–36-24 are disposed on the inner surface of the rotor yoke 25 with the even angles around the axis "C" of the shaft.

Furthermore, as shown in FIG. 8, the plural magnetic poles 36-1–36-24 have the respective arc-shaped widths 11–124 along the inner surface of the rotor yoke 25.

Now, a width 1i of a magnetic pole 36-i is represented by the below-mentioned equation concerning the central angle wi° (not shown) around the axis "C";

$$li=2\pi r\cdot wi/360,$$

wherein, "r" designates radius of the inner surface of the rotor yoke 25 around the axis "C".

In this second embodiment, the central angle wi° is defined by the following equation concerning the shift angle Δθi of the first embodiment;

$$wi=wm+\Delta\theta i,$$

wherein, "wm" designates the average of the respective central angles w1–w24 of the plural magnetic poles 36-1–36-24.

Thereby, the width li varies like a periodic function in accordance-to the variation of the shift angle Δθi. Furthermore, provided that, for example, the widths 112 and 124 are equal to a reference width lr, a difference between the reference width lr and the width li varies in a waveform of the triangular wave-type relation curve 80 of FIG. 3 with regard to the linear alignment of the plural magnetic poles 36-1–36-24 in order.

In each-other adjacent two magnetic poles, a maximum value of the shift angle is under the 360/Nc. As a result, the cogging torque of the second embodiment varies with shorter period than that of the prior art, and it is possible to decrease the cogging torque without loss of the effective magnetic flux.

Although the present invention has been described in terms of the presently preferred embodiment, it is to be understood that such disclosure is not to be interpreted as limiting. Various alternations and modifications will no doubt become apparent to those skilled in the art after having read the above disclosure. Accordingly, it is intended that the appended claims be interpreted as covering all alternations and modifications as fall within the true spirit and scope of the invention.

What is claimed is:

1. A direct current motor comprising:

a stator including a stator core, said stator core having Ns pieces of stator teeth; and a rotor including Nr pieces of magnetic poles, said magnetic poles facing said stator teeth, and each of said magnetic poles being disposed at such angular locations around said rotor that shift by predetermined shift angles from even angle-disposed reference angular positions in circumferential direction, said even angle-disposed reference angular positions being defined by dividing the circumference by even angles around an axis of said rotor;

said shift angles being in a range shown by an expression concerning the least common multiple Nc of said Nr and said Ns;

−180/Nc≦shift angles≦+180/Nc, wherein signs "−" and "+" in said expression show a shift direction of said magnetic poles from said even angle-disposed reference angular positions in the circumferential direction of said rotor, and thereby, a maximum value of said shift angles in each-other adjacent two magnetic poles is under 360/Nc.

2. A direct current motor in accordance with claim 1, wherein said magnetic poles are substantially of permanent magnet.

3. A direct current motor in accordance with claim 1, wherein said shift angles form a waveform of a periodic function with regard to the linear alignment of said magnetic poles in order.

4. A direct current motor in accordance with claim 3, wherein period of said periodic function of said shift angles is the rotation of the rotor multiplied by an inverse of an integer, such that an integer number of periods occur in one rotation of said rotor.

5. A direct current motor in accordance with claim 4, wherein said waveform of said periodic function is a triangular wave-type relation.

6. A direct current motor in accordance with claim 4, wherein said waveform of said periodic function is a sinusoidal wave-type relation.

7. A direct current motor in accordance with claim 1, wherein said magnetic poles of the even numbers are disposed shifted in one of said circumferential direction by said shift angles from said even angle-disposed reference angular positions, and said magnetic poles of the odd numbers are disposed shifted in the other of said circumferential direction by said shift angles from said even angle-disposed reference angular positions.

8. A direct current motor in accordance with claim 2 further comprising:

a rotor yoke connected to said rotor having plural recesses for mounting said magnetic poles on the inner surface of said rotor yoke to dispose said magnetic poles shifted by said shift angles.

9. A direct current motor in accordance with claim 8, wherein said magnetic poles consists of a main part for actuating said rotor and a sensor part for detecting a position of said rotor, said main part is disposed shifted by said shift angles, and said sensor part is disposed by said even angles.

10. A direct current motor comprising:

a stator including a stator core, said stator core having Ns pieces of stator teeth; and a rotor including Nr pieces of magnetic poles, said magnetic poles facing said stator teeth, each of said magnetic poles being disposed on said rotor by even angles around the axis of said rotor, and each of said magnetic poles having respective widths along and in the direction of the inner surface of said rotor;

each of said widths being defined by the following expressions;

$$\Delta\theta i = wi - wm, \text{ and}$$

$$-180/Nc \leq \Delta\theta i \leq +180/Nc,$$

wherein, $\Delta\theta i$ designates a shift angle, $wi$ designates the angle about which width $li$ it is center $wm$ designates the average of said respective $wi$, and $Nc$ designates the least common multiple of said $Nr$ and said $Ns$, and thereby, a maximum valve of said $\Delta\theta i$ in each-other adjacent two magnetic poles is under $360/Nc$.

* * * * *

UNITED STATES PATENT AND TRADEMARK OFFICE
CERTIFICATE OF CORRECTION

PATENT NO. : 5,610,464
DATED : March 11, 1997
INVENTOR(S) : Yoshinari ASANO et al.

It is certified that error appears in the above-indentified patent and that said Letters Patent is hereby corrected as shown below:

<u>Col. 12</u>, line 25, delete "it is center" insert
--is center,--.

Signed and Sealed this

Fourteenth Day of April, 1998

Attest:

BRUCE LEHMAN

Attesting Officer     Commissioner of Patents and Trademarks